United States Patent
McCraw et al.

(10) Patent No.: US 6,804,515 B1
(45) Date of Patent: Oct. 12, 2004

(54) TRANSPORTABLE INFRASTRUCTURE FOR AIRBORNE CELLULAR SYSTEM

(75) Inventors: Dawn M. McCraw, Phoenix, AZ (US); Cynthia C. Matthews, Phoenix, AZ (US); Mary M. Madine, Tempe, AZ (US); Craig L. Fullerton, Chandler, AZ (US); John Daniel St. Peter, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 430 days.

(21) Appl. No.: 09/604,143

(22) Filed: Jun. 27, 2000

(51) Int. Cl.[7] .............................. H04Q 7/20; H04B 7/15; H04B 1/38; H04M 1/00
(52) U.S. Cl. ...................... 455/431; 455/11.1; 455/560
(58) Field of Search .............................. 455/431, 422, 455/404, 428, 7, 11.1, 12.1, 13.1, 560, 561, 462, 463, 465, 16, 554.1, 66.1, 575.1, 575.9, 90.3

(56) References Cited

U.S. PATENT DOCUMENTS 2,598,064 A 5/1952 Lindenblad (List continued on next page.)

FOREIGN PATENT DOCUMENTS

| EP | 0 421 704 A2 | 10/1990 |
|----|----|----|
| EP | 0 618 704 A1 | 11/1994 |
| EP | 0 789 498 A2 | 8/1997 |
| EP | 0 803 742 A2 | 10/1997 |
| EP | 0 837 567 A2 | 10/1997 |
| EP | 0 939 569 A1 | 2/1998 |
| EP | 0 901 240 A2 | 3/1999 |
| FR | 2757331 A | 12/1997 |
| GB | 2 320 992 A | 11/1997 |
| GB | 2318948 A | 5/1998 |
| JP | 3104426 A2 | 5/1991 |
| WO | WO 95 04407 | 2/1995 |
| WO | WO 96 02094 | 1/1996 |
| WO | WO 96 16489 | 5/1996 |
| WO | WO 97 07609 | 2/1997 |
| WO | WO 97 19525 | 5/1997 |
| WO | WO 97 23104 A1 | 6/1997 |
| WO | WO 98 51568 | 5/1998 |
| WO | WO 98 44639 | 10/1998 |
| WO | WO 99 13598 | 3/1999 |
| WO | WO 99 23769 A1 | 5/1999 |
| WO | WO 99 45609 | 9/1999 |
| WO | WO 99 46877 | 9/1999 |
| WO | WO 00 14902 | 3/2000 |

OTHER PUBLICATIONS

"51.84 Mbps Airborne Wireless Experiments: A Prelude to the Emerging HALO ™ Communication Technology", IEEE 0–7803–5554–7/99, Jon Aasterud et al.

(List continued on next page.)

Primary Examiner—Vivian Chin
Assistant Examiner—Raymond B Persin
(74) Attorney, Agent, or Firm—Charles W. Bethards

(57) ABSTRACT

A wireless communications system infrastructure includes an integrated unit of RF and switch components mounted on a transportable platform for providing a communications link to a public switched telephone network. An airplane for executing a predetermined flight pattern includes a repeater for communicating with the integrated unit of RF and switch components and provides a link between the integrated RF and switch components and operational handsets within a repeater geographic area of coverage corresponding to the flight pattern. The wireless communications system infrastructure is therefore capable of being positioned strategically with respect to terrestrial cell stations and with respect to a flight pattern of the plane carrying the repeater to provide coverage to areas that otherwise may be out of range of an airborne repeater and conventional wireless system infrastructure components.

19 Claims, 3 Drawing Sheets

U.S. PATENT DOCUMENTS

| | | | |
|---|---|---|---|
| 2,626,348 A | | 1/1953 | Nobles |
| 2,627,021 A | | 1/1953 | Hansell et al. |
| 2,748,266 A | | 5/1956 | Boyd |
| 3,866,227 A | | 2/1975 | Ruvin |
| 4,121,158 A | * | 10/1978 | Hanni .......................... 455/524 |
| 4,539,706 A | * | 9/1985 | Mears et al. ................ 455/11.1 |
| 5,063,387 A | | 11/1991 | Mower |
| 5,067,172 A | | 11/1991 | Schloemer |
| 5,123,112 A | | 6/1992 | Choate |
| 5,187,805 A | | 2/1993 | Bertiger et al. |
| 5,455,964 A | | 10/1995 | Roos et al. |
| 5,479,482 A | | 12/1995 | Grimes |
| 5,490,284 A | * | 2/1996 | Itoh et al. .................... 455/428 |
| 5,530,909 A | | 6/1996 | Simon et al. |
| 5,548,292 A | | 8/1996 | Hirshfield et al. |
| 5,557,656 A | | 9/1996 | Ray et al. |
| 5,559,865 A | | 9/1996 | Gilhousen |
| 5,574,968 A | | 11/1996 | Olds et al. |
| 5,619,211 A | | 4/1997 | Horkin et al. |
| 5,625,867 A | | 4/1997 | Rouffet et al. |
| 5,657,032 A | | 8/1997 | Liechty et al. |
| 5,678,184 A | | 10/1997 | Cutler, Jr. et al. |
| 5,748,104 A | * | 5/1998 | Argyroudis et al. ... 340/870.11 |
| 5,774,790 A | | 6/1998 | Dupuy |
| 5,790,939 A | | 8/1998 | Malcolm et al. |
| 5,832,380 A | | 11/1998 | Ray et al. |
| 5,890,079 A | | 3/1999 | Levine |
| 5,920,284 A | * | 7/1999 | Victor ................... 342/357.01 |
| 5,937,349 A | | 8/1999 | Andresen |
| 5,966,670 A | * | 10/1999 | Keskitalo et al. ......... 455/562.1 |
| 5,974,349 A | | 10/1999 | Levine |
| 6,006,084 A | | 12/1999 | Miller et al. |
| 6,018,659 A | | 1/2000 | Ayyagari et al. |
| 6,061,561 A | | 5/2000 | Alanara et al. |
| 6,061,562 A | | 5/2000 | Martin et al. |
| 6,072,428 A | | 6/2000 | Schipper et al. |
| 6,073,004 A | | 6/2000 | Balachandran |
| 6,127,946 A | | 10/2000 | Tzidon et al. |
| 6,148,196 A | * | 11/2000 | Baumann ..................... 455/427 |
| 6,246,883 B1 | * | 6/2001 | Lee ............................. 455/507 |
| 6,285,878 B1 | | 9/2001 | Lai |
| 6,324,398 B1 | * | 11/2001 | Lanzerotti et al. .......... 455/431 |
| 6,388,615 B1 | * | 5/2002 | Chang et al. ................ 342/368 |
| 6,507,739 B1 | * | 1/2003 | Gross et al. ................. 455/431 |
| 6,642,894 B1 | * | 11/2003 | Gross et al. ................. 343/705 |
| 6,675,013 B1 | * | 1/2004 | Gross et al. ................. 455/431 |
| 2002/0019229 A1 | * | 2/2002 | Usher et al. ................. 455/435 |
| 2002/0049055 A1 | * | 4/2002 | Matthews et al. .......... 455/431 |
| 2002/0072361 A1 | * | 6/2002 | Knoblach et al. ........... 455/431 |

OTHER PUBLICATIONS

"Establishing Wireless Communications Services Via High–altitude Aeronautical Platforms: A Concept Whose Time Has Come?", Djuknic et al, IEEE Communications Magazine, Sep. 1, 1997, pp. 128–135.

"*On the Use of HALE Platforms as GSM Base Stations*", IEEE Personal Communications, Apr. 2001 vol. 8 No. 2, pp. 37–43.

"Relay Aircraft Enable Cell 'Network in the Sky'", William B. Scott, Aviation Week and Space Technology, Jun. 29, 1998, pp. 22–23.

"*Revised Technical And Operational Parameters For Typical IMT–2000 Terrestrial Systems Using High Altitude Platform Stations And CDMA Radio Transmission Technologies*", Radiocommunication Study Groups, Mar. 4, 1999.

"Airborne Relay Communication System"—System Demonstration—public handout at public demonstration, May 1, 1998, 36 pages.

"Concept Overview", Angel Technologies Corporation Web Page Printout, (www.angelcorp.com), Mar. 1998, 7 pages.

"Hail HALE, the Answers May All Be Here", Thomas W. Will, Ph.D., Joseph N. Pelton, Ph.D., Unmanned Systems Magazine, Winter' 1995, pp. 31–34.

"High–Capacity Aerial Vehicles Aid Wireless Communications", Signal Magazine, Apr. 1997, 6 pages.

"Geosynchronous Satellites at 14 Miles Altitude?", Joseph N. Pelton, Ph.D., New Telecom Quarterly, Second Quarter 1995 (2Q95), pp. 11–16.

* cited by examiner

TRANSPORTABLE INFRASTRUCTURE FOR AIRBORNE CELLULAR SYSTEM

FIELD OF THE INVENTION

The present invention relates generally to a wireless communications system and particularly to transportable infrastructure that enables a wireless communications system to provide service to areas that are not served by conventional terrestrial wireless stations.

BACKGROUND OF THE INVENTION

The increasing need for communications networks and capabilities in outlying and geographically diverse locations has created greater demand for cellular systems. Many new carriers providing the infrastructure for such systems have focused their resources on building as many terrestrial cell stations as possible to expand their respective areas of coverage and consequently generate more revenue.

However, the buildout rate for the terrestrial cell stations is typically slow and expensive, especially in mountainous or otherwise difficult to access areas. In addition, in some these areas, a carrier's return on investment may not provide the incentive necessary for the carrier to build the necessary cell stations, thereby leaving these areas with either limited or no cellular service at all. Further, many areas having a sufficient number of cellular communications base transceiving stations to handle calls during both off-peak and peak times cannot adequately handle large volumes of calls during sporting events or other short-term special events that temporarily attract large crowds. In addition, in remote geographic areas, in areas that have been hit by natural disaster, or in areas that have been transformed into, for example, a military theater, terrestrial cell stations may not be available within the given terrestrial range necessary to establish communication links with the airborne repeater, thereby limiting the overall effectiveness of the system.

Satellites represent one possible solution to the above system needs. However, because satellites must be developed far in advance of providing the contemplated service, it is difficult to predict the future service and bandwidth needs that may be required in target localized areas. In addition, because the above-discussed events are highly localized, satellite-based service would be inefficient, expensive and would very likely not be able to provide the necessary bandwidth to support the local traffic load.

Non-commercial airborne cellular systems have also been proposed in which a cellular repeater mounted in an airplane flying a predetermined flight pattern over a geographic area requiring cellular coverage backhauls calls from cellular phones within the covered geographic area to terrestrial base stations spread across the footprint. Because the airplane is capable of traversing geographic limitations and takes the place of the cell stations, such a system overcomes the above-mentioned limitations of conventional terrestrial cellular systems.

Nonetheless, an aircraft-based wireless system utilizing conventional base transceiving stations still may have certain limitations associated with its potential areas of coverage. For example, one currently-proposed airborne system requires that the airplane in which the repeater is located fly at high altitudes, therefore requiring costly special equipment for both airplane and pilots as well as pilots with special high altitude training. Clearly a need exists for solutions to the aforementioned problems.

BRIEF DESCRIPTION OF THE DRAWINGS

Advantages of the present invention will be readily apparent from the following detailed description of preferred embodiments thereof when taken together with the accompanying drawings in which.

DETAILED DESCRIPTION OF THE PREFERRED EMBODIMENTS

Figure 1:
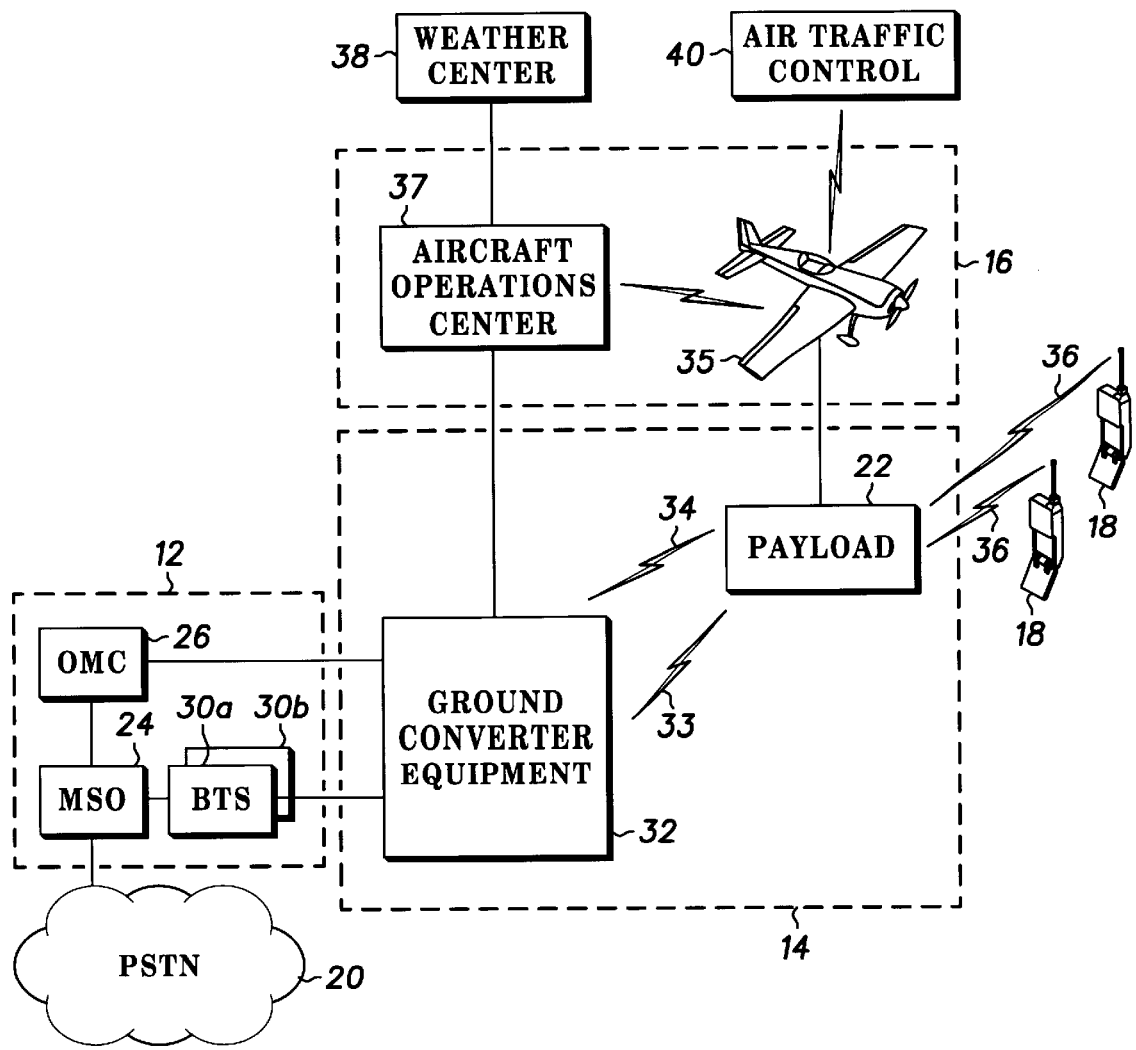
FIG. 1 is a system diagram of an airborne cellular communications system including a transportable infrastructure in accordance with the present invention.

Referring now to the drawings in which like numerals reference like parts, FIG. 1 shows an airborne cellular communications system 10. The system 10 is preferably designed to be protocol-independent and thus capable of supporting CDMA, TDMA, GSM, 3G, frequency-independent and other fixed and mobile protocols. Therefore, the system is capable of supporting cellular, PCS and higher frequencies (although, for purposes of discussion, reference will be made only to the cellular spectrum), and generally includes three primary segments: a cellular infrastructure segment 12, a radio infrastructure segment 14, and an airplane segment 16. These three segments in combination are capable of providing cellular communications coverage to a large geographical area by enabling system users, represented generally by handsets 18, to link to a public switched telephone network (PSTN) 20 via an airplane payload 22 including a repeater. According to one embodiment in accordance with the present invention and as will be described in further detail, the cellular infrastructure segment 12 and the radio infrastructure segment 14 are transportable segments capable of being easily relocated according to specific terrestrial coverage needs. However, the structure and function of each of these three system segments will first be discussed in detail.

The cellular infrastructure segment 12 includes a transportable switching office (MSO) 24 that includes equipment, such as a telephony switch, voicemail and message service centers, and other conventional components necessary for cellular service. The MSO 24 connects to the PSTN 20 to send and receive telephone calls in a manner well known in the industry. In addition, the MSO 24 is connected to an operations and maintenance center (OMC) 26 from which a cellular system operator manages the cellular infrastructure segment 12. The MSO 24 is also connected to one or more base transceiver stations (BTSs) such as the BTSs shown at 30a, 30b. The BTSs 30a, 30b transmit and receive RF signals from the system users 18 through the radio infrastructure segment 14.

More specifically, the BTS 30 transmits and receives RF signals through ground converter equipment 32. The ground converter equipment 32 converts terrestrial cellular format signals to C-band format signals and communicates with the airborne payload 22 through a feeder link 33 and a telemetry link 34, each of which will be discussed later in detail. The payload 22 establishes a radio link 36 for connecting calls over a wide geographic area of coverage, or footprint, that is capable of exceeding 350 km when the airplane maintains a flight pattern at or around 30,000 feet above the ground.

In addition to the airplane 35, the airplane segment 16 also includes an airplane operations center 37 that controls mission logistics based at least in part on information from sources such as a weather center 38, and manages all system airplanes, as the system preferably includes three airplanes (one in operation, one en route for changeover and one ground spare) to ensure continuous coverage. The airplane also receives additional routine instructions from sources such as an air traffic control center 40.

Figure 2:
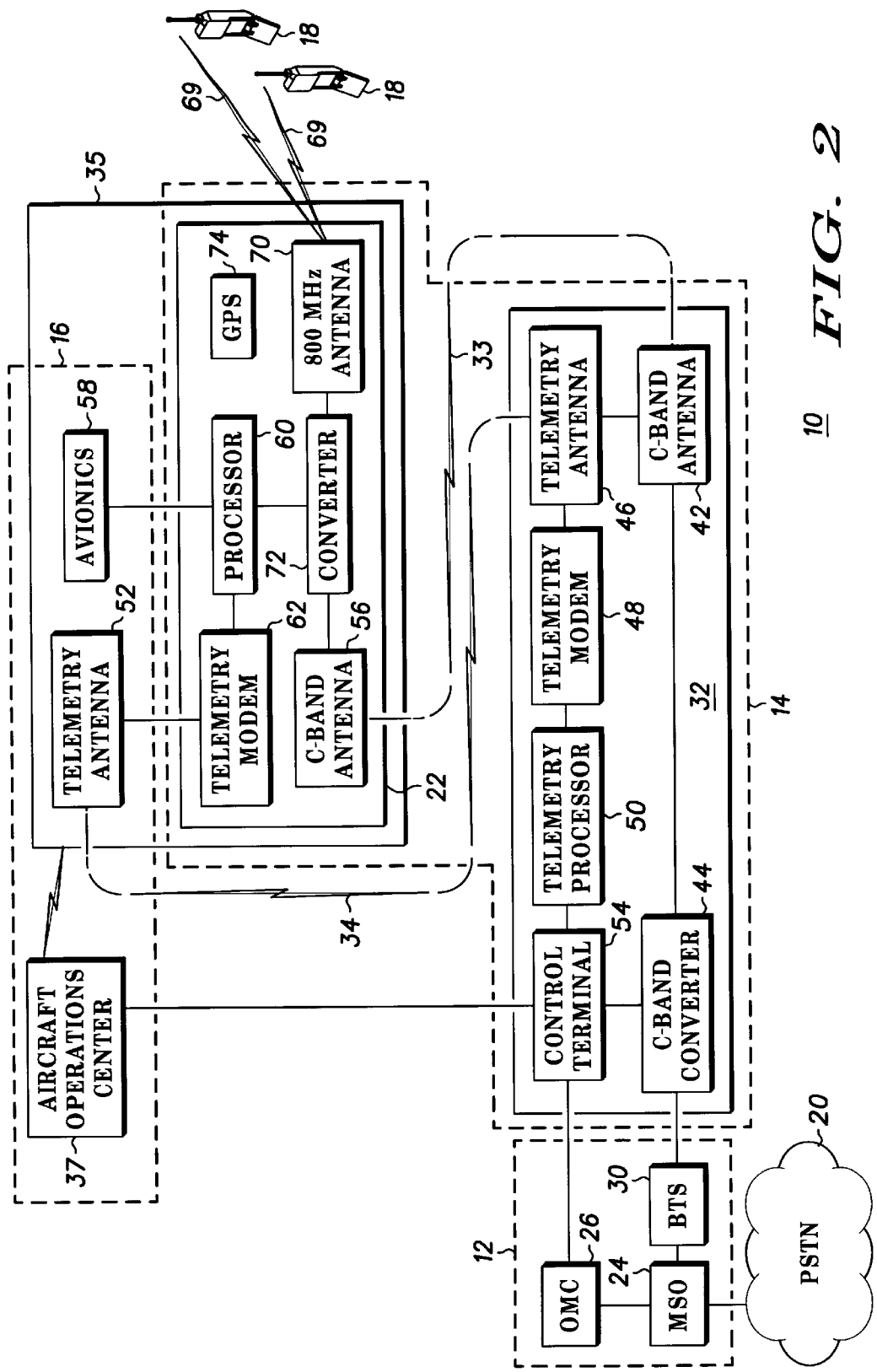
FIG. 2 is a physical block diagram illustrating the components of the airborne cellular communications system shown in FIG. 1 in more detail.

FIG. 2 shows certain components of the system 10 in more detail. Specifically, the ground converter equipment 32 includes two C-band antennas 42 for respectively receiving/transmitting signals from/to the payload 22, and a C-band converter 44 for appropriately converting the signals received from or to be transmitted to the payload 22. According to a preferred embodiment, the C-band antennas 42 and the converter 44 enable 800 MHz airborne cellular antennas 56 to communicate with the BTSs 30a, 30b via an established downlink, or feeder link, 33, and the converter 44 upconverts nominal signals from the BTSs 30a, 30b to C-band signals before the signals are transmitted to the airplane 35. Also, each sector of each BTS 30a, 30b is assigned a different slot in the C-band spectrum so that signals from the different BTSs 30a, 30b can be separated and routed to the correct antenna, such as the antenna 56, at the payload 22. In addition, the ground control equipment 32 includes telemetry components such as a telemetry antenna 46, a telemetry modem 48 and a telemetry processor 50 to receive and process airplane and payload data transmitted from an airplane telemetry antenna 52, while a control terminal 54 controls transmission of the processed telemetry data to the OMC 26 and the airplane operations center 37.

In the airplane segment 16, the airplane telemetry antenna 52 mentioned above transmits airplane avionics data generated by airplane avionics equipment, represented generally at 58, including airplane location, direction and flight pattern data as well as other data such as airplane pitch, roll and yaw data. The data from the airplane avionics equipment 58 is input into and processed by a payload processor 60 before being output to the telemetry antenna 52 through a telemetry modem 62. The payload processor 60 is also responsible for processing signals transmitted to and received from the ground converter equipment 32 through the feeder link 33 established between the C-band antennas 42, 56 and for processing signals transmitted to and received from the system users 18 through a downlink, or user link, 69 established between the users 18 and a payload downlink antenna such as an 800 MHz antenna 70, with the signals received by and transmitted from the payload being appropriately upconverted or downconverted by an 800 MHz converter 72. The payload 22, in addition to including the above-mentioned equipment, also includes GPS equipment 74 that can also be input into the processor 60 and transmitted to the ground converter equipment 32 and sent via landline to the airplane operations center 37 for flight control purposes. The components shown in the airplane and in the payload together form the airplane repeater that enables cellular coverage to be provided to a large geographic area that may otherwise not support terrestrial cellular coverage due to an insufficient number of cell stations or the like.

As should be appreciated from the system configuration shown in FIGS. 1 and 2, both the airborne cellular system 10 and conventional terrestrial cellular systems appear identical to the PSTN 20 and the system users 18. In other words, there are no discernable service-related differences between calls linked to the PSTN 20 through the cellular infrastructure, radio infrastructure and airplane segments 12–16 and calls handled through a conventional terrestrial system infrastructure, in part due to the fact that the cellular infrastructure segment 12 includes a standard telephony switch in the MSO 24 and BTSs 30a, 30b that are identical to those included in a conventional terrestrial system infrastructure. Also, the system 10 is designed to meet the performance requirement of standard handsets such as the handsets of the users 18.

Still referring to FIGS. 1 and 2, operation of the components of the airborne cellular system 10 during completion of a call made by one of the system users 18 will now be described. The airplane 35, when on-station preferably flies in a circular or near circular flight pattern (although the flight pattern may vary according to specific weather and coverage conditions) to provide coverage to a geographic area during a mission which typically lasts about 6 hours. While it is on-station, the airplane maintains contact with the ground converter equipment 32 to provide both the feeder link 33 and the user link 69 for the cellular infrastructure segment 12 through the radio infrastructure equipment segment 14. The airplane 35 also transmits a predetermined number of communications beams, such as, for example, 13 beams, over the coverage area, with each beam being assigned to a sector of one of the BTSs 30a, 30b and having its own set of control and traffic channels to carry signaling and voice data between the system users 18 and the cellular infrastructure segment 12. As the airplane 35 moves in its flight pattern, the beams radiated from the airplane rotate. Therefore, as the system users 18 will "see" a different beam every 45 seconds or so, the cellular infrastructure segment 12 performs a sector to sector handoff of the call to keep the call from being dropped.

When initiating a call, a system user, such as one of the users 18, utilizes the control channels in the beam to signal the MSO 24 to request a call setup. The request is sent from a handset of the user 18 to the airplane payload 22, and then is relayed to the ground converter equipment 32. The ground converter equipment 32 relays the request to the corresponding BTS, such as the BTS 30a. The BTS 30a then transmits the request to the MSO 24, which sets up the call with the PSTN 20. The payload 22 therefore simply extends the physical layer of the BTS 30 to the users 18 to allow a much wider area of coverage than would typically be provided by a conventional terrestrial system, and with less associated infrastructure buildout cost. The airborne system 10 is also preferable for providing temporary cellular coverage for special events areas, where coverage is only needed for several days, thereby eliminating the need and cost associated with erecting cell stations and then tearing the cell stations down after the special events end.

Once the call setup is completed, voice communication with the PSTN 20 through the traffic channels in the beam is initiated, and voice information is then relayed in the same manner as the signaling information. When the call ends, a signal is sent to the MSO 24 to tear down the call, the handset of the user 18 releases the traffic channel used for voice communications, and the channel is returned to an idle state.

Figure 3:
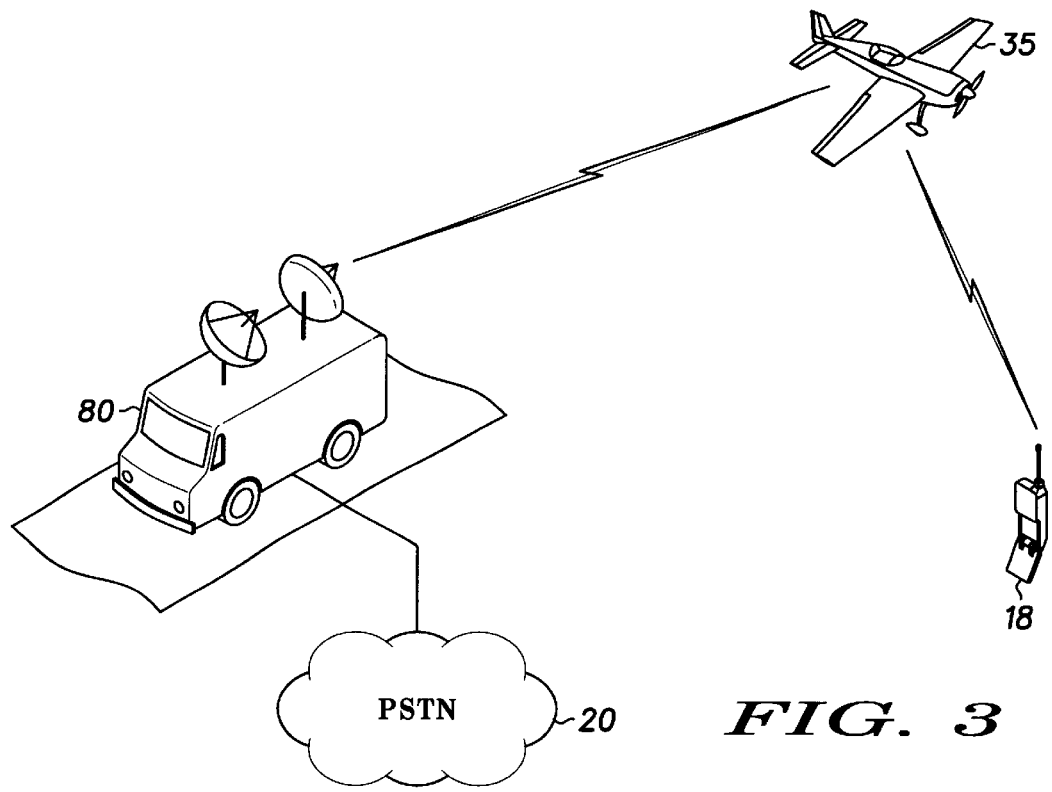
FIG. 3 is a diagram illustrating the transportable infrastructure for the cellular communications system of FIG. 1 according to a first preferred embodiment.

Referring now to FIG. 3, a transportable infrastructure of a preferred embodiment in accordance with the present invention is shown at 80. The transportable infrastructure is housed in a transportable infrastructure platform, which in the embodiment shown is a trailer 80 of a tractor-trailer rig. The components necessary to implement the cellular and radio infrastructure segments 12, 14 are scaled to enable them to be housed within the trailer 80, thereby enabling the cellular and radio infrastructure segments 12, 14 to be relocated to a target geographic area of coverage. The components of the cellular and radio infrastructure segments 12, 14 are capable of being fit into the trailer 80 in part due to the fact that fewer BTS units such as the BTSs 30a, 30b are required, as compared to the number required in a conventional terrestrial system. In a conventional terrestrial system, cell sites are often added to increase coverage, not because of an increased need for localized capacity. Deploying such sites is inefficient from a BTS capability standpoint. A single sector and single traffic channel requires as much real estate, tower structure, chasis equipment, housing and possible transmission infrastructure as a fully-loaded BTS. Since, in the system 10 all BTSs such as the BTSs 30a, 30b are co-located, only a minimally sized BTS chasis is required to house requisite channel cards (not shown). No towers or separate housings are required, and a single transmission line and two C-band antennas replace the multiple T-1 lines and antennas required in a terrestrial system. Therefore, maximum BTS utilization can be maintained with, for example, five BTSs and a single site in the system 10 being equivalent to 30 terrestrial cell sites.

In operation, when a geographical area requiring cellular service is identified, airplanes such as the airplane 35 including an airborne repeater such as the protocol-independent payload 22 can be flown to the area, while the trailer 80 housing the cellular and radio infrastructure segments 12, 14 can be driven to the area. Only minimal on-site preparations need be made prior to service set-up. For example, a dirt runway and hangar may be prepared to enable the airplanes such as the airplane 35 to land for re-fueling and maintenance purposes. Once a link, such as a T-1 or microwave link, from the MSO 24 to the PSTN 20 is established, the system is capable of being fully operational and of providing cellular coverage to an area of, for example, 100 km to 300 km in radius.

Figure 4:
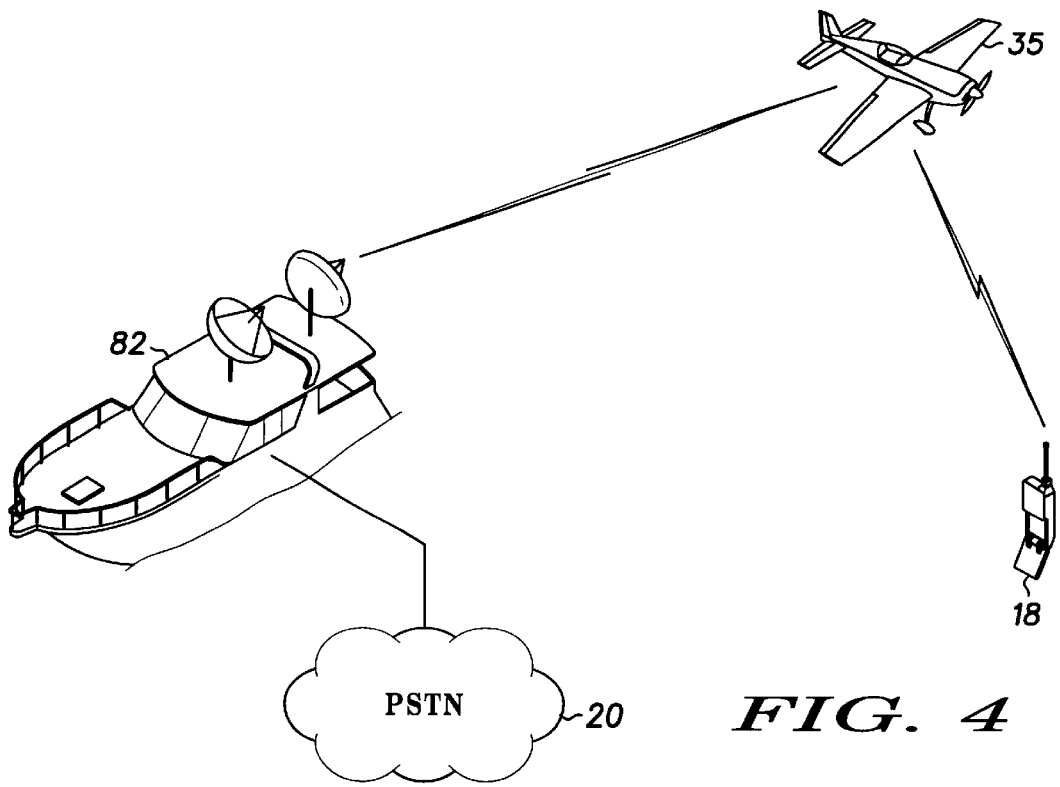
FIG. 4 is a diagram illustrating a transportable infrastructure for the cellular communications system of FIG. 1 according to a second preferred embodiment.

FIG. 4 illustrates an alternative embodiment of the transportable infrastructure of the present invention. While the cellular and radio infrastructure segments 12, 14 are housed in the trailer 80 in FIG. 3, the segments may alternatively be housed within other transportable structures, such as within a ship 82. The actual type of vehicle used to house and transport the transportable infrastructure may be chosen according to the type and location of the area to which service is to be provided. Therefore, for areas accessible by road, an automotive-based platform such as the one shown in FIG. 3 may be selected, while for remote area that is not accessible by road but that is located near a body of water, a water-based platform such as the ship 82 may be selected. In addition, the cellular and radio infrastructure segments 12, 14 may be housed in another airplane, flown to a service area and operated from the plane when the plane is grounded or transported from the plane to a fixed housing structure.

As should be appreciated from the above description, the transportable infrastructure of the above-described embodiment in accordance with the present invention shown in FIG. 3 enables cellular coverage to be quickly initiated for a specified geographic area without the conventional terrestrial system start-up time and costs associated with analyzing area terrain and then building a number of cell stations sufficient to handle call traffic, and in which a conventional terrestrial cell system infrastructure would be difficult or impossible to implement, particularly in areas such as military theater operation or natural disaster areas. Also, the transportable infrastructure of the present invention can facilitate fully operational communications coverage for a very large geographical area in a matter of hours.

Further, if cellular service needs to be provided to an area only on a temporary basis, the transportable infrastructure of the present invention obviates the need and associated cost of tearing down terrestrial cell stations built specifically to provide temporary coverage upon completion of the coverage. Because the transportable infrastructure of the present invention is designed to be protocol-independent and to therefore work with existing standard phone protocol such as CDMA, TDMA, GSM, 3G, frequency-independent and other fixed and mobile protocols and the like, and because the majority of the payload 22 operates at intermediate frequency, the backhaul link 33 to the ground converter equipment 32 has a high degree of operational flexibility and can be adjusted as required to accommodate an operator's spectrum license.

Consequently, use of the transportable infrastructure of the present invention is contemplated in natural disaster areas such as areas hit by earthquake, flood or hurricane, or fire, medical emergency areas, such as areas in which transportation or industrial accidents have occurred, military theater areas, such as battle zones or refugee camp areas, and areas in which events such as the Olympics, the Superbowl, or the Carnival in Rio de Janeiro are being held. In addition, use of the transportable infrastructure of the present invention is contemplated to provide temporary operational service for service providers in situations where the providers need service capabilities to avoid regulatory penalties, and for infrastructure providers requiring service capabilities to avoid contract penalties.

While the above description is of the preferred embodiment of the present invention, it should be appreciated that the invention may be modified, altered, or varied without deviating from the scope and fair meaning of the following claims.

What is claimed is:

1. A wireless communications system infrastructure, comprising:

a transportable switching office for the wireless communications system infrastructure comprising an integrated unit of RF and switch components mounted on a transportable ground-based platform and being movable for providing a communications link to a public switched telephone network, wherein the transportable switching office further comprises a ground-based antenna in communication with the integrated unit of RF and switch components; and an airplane for executing a predetermined flight pattern and including a repeater for communicating with the integrated RF, an aircraft antenna, and switch components to provide a plurality of links between the integrated RF and switch components and operational handsets within a repeater geographic area of coverage, wherein each link is established via a connection between the ground-based antenna and the aircraft antenna, and wherein the airplane is further configured for providing a plurality of communications beams to provide the plurality of links to the operational handsets, and wherein the beams are configured to rotate about each other such that each operational handset periodically receives a new beam of the plurality of communications beams from the airplane.

2. The wireless communications system infrastructure of claim 1, further comprising an airplane operations center for providing operational information to the airplane.

3. The wireless communications system infrastructure of claim 1, wherein the integrated unit of RF and switch components comprises:

a ground converter for converting signals transmitted to and received from the repeater to signals within acceptable transmission and reception frequencies;

a base transceiver for transmitting and receiving signals to and from the ground converter;

a transportable switching office for linking the base transceiver station to a publicly switched telephone network; and an operations and maintenance controller for controlling switching operation of the transportable switching office and for controlling communications traffic via the base transceiver.

4. The wireless communications system infrastructure of claim 1, wherein the integrated unit of RF and switch components is mounted on one of an automotive-based platform, a water vessel, and an infrastructure-carrying plane.

5. The wireless communications system infrastructure of claim 1, wherein the repeater is protocol independent.

6. The wireless communications system infrastructure of claim 1, wherein the integrated unit of RF and switch components and the repeater are capable of supporting cellular, PCS and higher frequencies.

7. The wireless communications system infrastructure of claim 1, further comprising at least one additional base transceiver located within the integrated unit of RF and switch components.

8. The wireless communications system infrastructure of claim 1, wherein the integrated unit of RF and switch components and the repeater provide terrestrial communications coverage to an area that is between 100–300 km in radius.

9. The wireless communications system infrastructure of claim 1 wherein the airplane executes the predetermined flight pattern at an altitude of less than 40,000 feet.

10. The wireless communications system infrastructure of claim 1 wherein the airplane executes the predetermined flight pattern at an altitude between 25,000 feet and 35,000 feet above the surface of the earth.

11. The wireless communications system infrastructure of claim 1 wherein the transportable switching office is configured to perform handoffs when the operational handset receives the new beam to thereby avoid dropping one of the plurality of links between the integrated RF and switch components and the operational handset.

12. A transportable infrastructure for an airborne wireless communications system having an airborne repeater and a plurality of operational handsets, comprising:

a transportable platform positioned at a ground-based terrestrial location, wherein the transportable platform is movable to enable wireless communications coverage to be provided to a predetermined geographic area;

a ground converter and antenna mounted on the transportable platform for converting transmitted and received communications signals to signals having acceptable transmission and reception frequencies to communicate with the airborne repeater in an aircraft flying a pre-determined flight pattern corresponding to the predetermined geographic area, wherein the airborne repeater is configured to provide a plurality of communications beams to provide a plurality of links to the operational handsets, and wherein the beams are configured to rotate about each other such that each operational handset periodically receives a new beam of the plurality of communications beams from the airplane;

a base transceiver mounted on the transportable platform for transmitting and receiving the signals between the ground converter and the airborne repeater via the antenna;

a transportable switching office mounted on the transportable platform for linking the base transceiver to a publicly switched telephone network; and an operations and maintenance controller mounted on the transportable platform for controlling switching operation of the transportable switching office and for controlling communications traffic between operational ground-based communications devices within the predetermined geographic area and the base transceiver via the airborne repeater.

13. The transportable infrastructure of claim 12, wherein the integrated unit of RF and switch components is mounted on one of an automotive-based platform, a water vessel, and an infrastructure-carrying plane.

14. The transportable infrastructure of claim 12, wherein the integrated unit of RF and switch components is protocol independent.

15. The transportable infrastructure of claim 12, wherein the repeater is protocol independent.

16. The transportable infrastructure of claim 12, wherein the integrated unit of RF and switch components and the repeater are capable of supporting cellular, PCS and higher frequencies.

17. The transportable infrastructure of claim 12, further comprising at least one additional base transceiver located within the integrated unit of RF and switch components.

18. The transportable infrastructure of claim 12, wherein the integrated unit of RF and switch components and the repeater provide terrestrial communications coverage to an area that is between 100–300 km in radius.

19. A transportable switching office comprising an integrated unit of RF and switch components configured to provide a protocol-independent switching infrastructure for a wireless communications system, the integrated unit of RF and switch components being mounted on a ground-based transportable platform having an antenna that is configured to be positioned to provide a communications link to an airborne repeater to thereby establish a connection between a public switched telephone network and a plurality of communications devices operating within an integrated unit geographic area of coverage, and wherein the airborne repeater is configured to providing a plurality of communications beams to the plurality of communications devices, and wherein the plurality of communications beams are configured to rotate about each other such that each communications device periodically receives a new beam of the plurality of communications beams from the airborne repeater.

* * * * *